United States Patent

Caffee

(10) Patent No.: US 9,989,927 B1
(45) Date of Patent: Jun. 5, 2018

(54) RESISTANCE-TO-FREQUENCY CONVERTER

(71) Applicant: Silicon Laboratories Inc., Austin, TX (US)

(72) Inventor: Aaron J. Caffee, Scappoose, OR (US)

(73) Assignee: Silicon Laboratories Inc., Austin, TX (US)

( * ) Notice: Subject to any disclaimer, the term of this patent is extended or adjusted under 35 U.S.C. 154(b) by 0 days. days.

(21) Appl. No.: 15/365,869

(22) Filed: Nov. 30, 2016

(51) Int. Cl.
H03M 1/50 (2006.01)
G04F 10/00 (2006.01)

(52) U.S. Cl.
CPC .................. G04F 10/005 (2013.01)

(58) Field of Classification Search
CPC .................................................. G04F 10/005
USPC ............... 341/155, 166, 118, 120; 340/10.1; 327/512
See application file for complete search history.

(56) References Cited

U.S. PATENT DOCUMENTS

| | | | |
|---|---|---|---|
| 4,906,944 A | 3/1990 | Frerking | |
| 5,081,431 A | 1/1992 | Kobo et al. | |
| 5,182,528 A | 1/1993 | Zuta | |
| 5,940,786 A * | 8/1999 | Steeby | G06F 1/206 327/378 |
| 6,954,020 B2 | 10/2005 | Ma et al. | |
| 7,224,210 B2 | 5/2007 | Garlapati et al. | |
| 7,253,677 B1 | 8/2007 | Kuramochi | |
| 7,321,225 B2 | 1/2008 | Garlapati et al. | |
| 7,525,392 B2 | 4/2009 | Tarng | |
| 7,852,144 B1 | 2/2010 | Zonte | |
| 7,724,068 B1 | 5/2010 | Smith et al. | |
| 7,854,174 B2 | 12/2010 | Aebersold et al. | |
| 7,982,550 B1 | 7/2011 | Quevy et al. | |
| 9,068,896 B2 * | 6/2015 | Yun | G01K 7/32 |
| 9,356,606 B2 | 5/2016 | Caffee | |
| 9,489,000 B2 | 11/2016 | Caffee et al. | |
| 2002/0011902 A1 | 1/2002 | Ipek et al. | |

(Continued)

OTHER PUBLICATIONS

Perrott, Michael H. et al., "A Temperature-to-Digital Converter for a MEMS-Based Programmable Oscillator With <±0.5-ppm Frequency Stability and < 1-ps Integrated Jitter," IEEE Journal of Solid-State Circuits, vol. 48, No. 1, Jan. 2013, pp. 276-291.

(Continued)

*Primary Examiner* — Peguy Jean Pierre
(74) *Attorney, Agent, or Firm* — Zagorin Cave LLP

(57) ABSTRACT

A technique for sensing an environmental parameter is disclosed. The technique generates an oscillating signal using a variable resistance sensitive to a variable parameter. A frequency of the oscillating signal is directly dependent on the variable resistance. A time-to-digital converter generates a digital code indicative of the variable resistance. The digital code is generated based on the frequency of the oscillating signal and a second frequency of a reference clock signal. The second frequency is insensitive to the variable parameter. The variable resistance may be a metal resistor and the reference resistance may be generated using a capacitor that is switched at a particular frequency. The measured resistance may be used to control a voltage-controlled oscillator. The oscillating signal frequency may be converted to a digital signal and post-processed for use as an indicator of absolute temperature or other environmental parameter.

17 Claims, 4 Drawing Sheets

(56) References Cited

U.S. PATENT DOCUMENTS

| | | |
|---|---|---|
| 2003/0197567 A1 | 10/2003 | Villela |
| 2007/0247245 A1 | 10/2007 | Hagelin |
| 2007/0273407 A1 | 11/2007 | Euda |
| 2007/0290763 A1 | 12/2007 | Partridge et al. |
| 2008/0007362 A1 | 1/2008 | Partridge et al. |
| 2009/0051342 A1 | 2/2009 | Peng |
| 2009/0121808 A1 | 5/2009 | Van Beek et al. |
| 2010/0225483 A1 | 9/2010 | Scheucher et al. |
| 2011/0057709 A1 | 3/2011 | Laraia et al. |
| 2011/0254613 A1 | 10/2011 | Kim |
| 2012/0043999 A1 | 2/2012 | Quevy et al. |
| 2012/0133448 A1 | 5/2012 | Gregg et al. |
| 2012/0161741 A1 | 6/2012 | Zambetti |
| 2012/0268216 A1 | 10/2012 | Borremans |
| 2012/0274410 A1 | 11/2012 | Koyama |
| 2013/0106497 A1 | 5/2013 | Lutz et al. |
| 2013/0239695 A1 | 9/2013 | Tai |
| 2013/0320955 A1 | 12/2013 | Kratyuk et al. |
| 2013/0335148 A1* | 12/2013 | Kousai .................... H03L 7/00 331/2 |
| 2014/0176251 A1 | 6/2014 | Seth et al. |
| 2015/0145607 A1 | 5/2015 | Caffee |
| 2015/0285691 A1 | 10/2015 | Caffee et al. |
| 2016/0259747 A1* | 9/2016 | Vandersteegen ........ G06F 1/266 |
| 2016/0336955 A1* | 11/2016 | Matsuzawa ............. H03M 1/60 |

OTHER PUBLICATIONS

Putter, B.M., "On-chip RC measurement and calibration circuit using Wheatstone bridge," IEEE International Symposium on Circuits and Systems, 2008. ISCAS 2008, May 18-21, 2008, pp. 1496-1499.

U.S. Appl. No. 14/963,462, filed Dec. 9, 2015, by Caffee et al., entitled "Oscillator Amplifier Biasing Technique to Reduce Frequency Pulling".

* cited by examiner

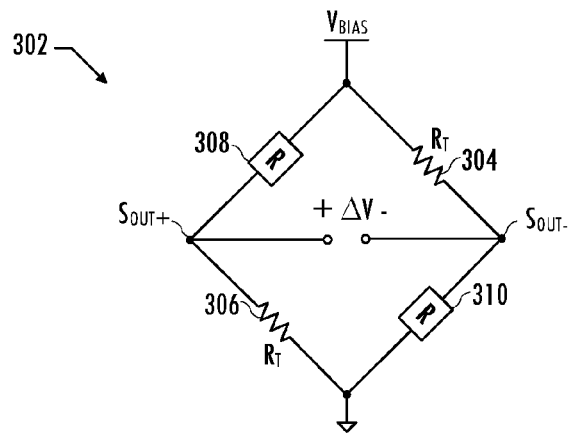
FIG. 4
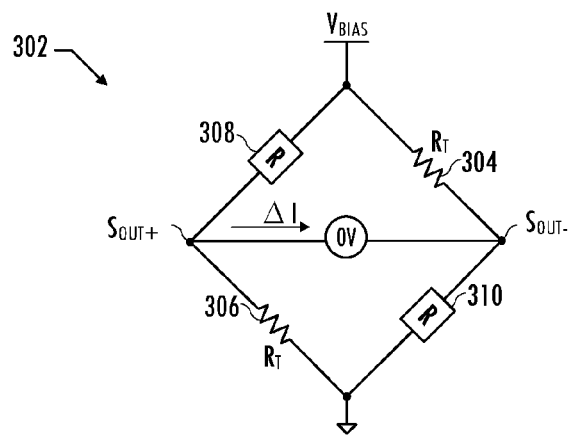
FIG. 5
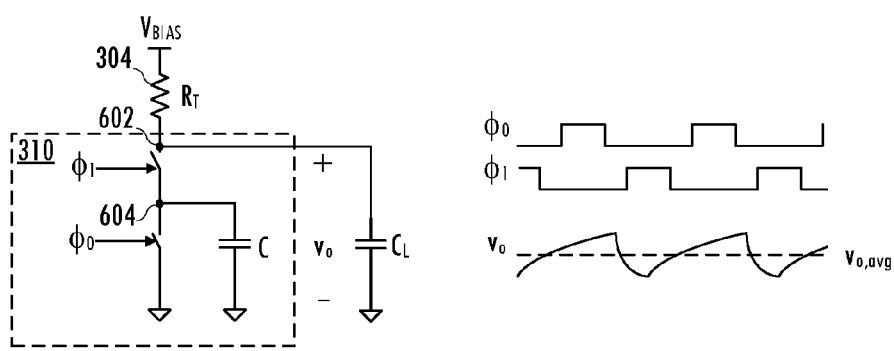
FIG. 6A  FIG. 6B

RESISTANCE-TO-FREQUENCY CONVERTER

BACKGROUND

Field of the Invention

This application relates to integrated circuits and more particularly to integrated circuit sensors.

Description of the Related Art

In general, sensing an environmental parameter (e.g., temperature or strain) on an integrated circuit includes taking measurements using integrated circuit devices that have electronic behavior sensitive to the environmental variable being sensed. Parameters of the integrated circuit devices may vary as a function of other environmental parameters (e.g., aging) that cause electrical nonlinearities, thereby changing the operational characteristics of the device and that affect the achievable accuracy of a sensor. Although a resulting parameter shift may have an expected value, the parameter shift may be unpredictable.

For example, typical devices used for sensing temperature have high sensitivity to mechanical strain. In general, strain is a change in element length $\Delta L$ over the original element unit length L (e.g., $S=\Delta L/L$). Packaging stress may cause strain on an integrated circuit die, resulting in a shift in electronic behavior of temperature sensing devices of the integrated circuit die. If strain on the integrated circuit die is not properly calibrated, then an apparent shift in temperature may occur in a temperature sensor of the integrated circuit die. The apparent shift will reduce the accuracy of a sensed temperature. Although strain sensors can be included in a system on the integrated circuit to compensate for these effects, the practical implementation of such a compensation mechanism can be costly. Therefore, improved techniques for sensing environmental parameters by an integrated circuit are desired.

SUMMARY OF EMBODIMENTS OF THE INVENTION

In at least one embodiment of the invention, an apparatus includes an oscillator circuit configured to generate an oscillating signal. The oscillator circuit comprises a variable resistance sensitive to a variable parameter. A frequency of the oscillating signal is directly dependent on the variable resistance. The apparatus includes a time-to-digital converter configured to generate a digital code indicative of the variable resistance. The digital code is generated based on the frequency of the oscillating signal and a second frequency of a reference clock signal. The second frequency is insensitive to the variable parameter. The oscillator circuit may include a first resistor providing the variable resistance, a first switched capacitor circuit configured to provide a reference resistance in response to the oscillating signal, a first node coupled between the first resistor and the first switched capacitor circuit, an amplifier configured to generate a control signal based on a first signal on the first node, and a voltage controlled oscillator circuit configured to generate the oscillating signal in response to the control signal. The apparatus may further include a second resistor having the variable resistance, a second switched capacitor circuit configured to provide the reference resistance in response to the oscillating signal, and a second node coupled between the second resistor and the second switched capacitor circuit. The amplifier may be further configured to generate the control signal based on a differential signal on the first node and the second node. The first switched capacitor circuit may include a plurality of switched capacitors. Each of the plurality of switched capacitors may be responsive to a corresponding phase of a plurality of phases of the oscillating signal. The time-to-digital converter may be a frequency counter and the digital code indicates the frequency of the oscillating signal relative to the second frequency. The oscillator circuit may include a ring oscillator circuit having a plurality of stages. Each stage of the plurality of stages may include an inverter and a low-pass filter coupled to an output of the inverter. The low-pass filter may include a resistor providing the variable resistance and a capacitor coupled between the resistor and a voltage reference node.

In at least one embodiment of the invention, a method includes generating an oscillating signal having a frequency directly dependent on a variable resistance. The variable resistance is sensitive to a variable parameter. The method includes generating a digital code indicative of the variable resistance. The digital code is generated based on the frequency of the oscillating signal and a second frequency of a reference clock signal. The second frequency is insensitive to the variable parameter. Generating the oscillating signal may include generating a reference resistance by transferring charge at a switching frequency in response to an oscillating signal, generating a control signal based on a first signal on a first node, and generating the oscillating signal in response to the control signal. The control signal may be indicative of the variable resistance of a first resistor. The control signal may be generated further based on a second signal on a second node. The first node and the second node may provide a differential error signal indicative of a difference between the reference resistance and the variable resistance. The control signal may be strain-invariant and the variable parameter may be absolute temperature. The digital code may be indicative of the frequency relative to the second frequency. Generating the reference resistance may include driving a plurality of switched capacitors at the switching frequency using corresponding phases of a plurality of phases of the oscillating signal.

BRIEF DESCRIPTION OF THE DRAWINGS

The present invention may be better understood, and its numerous objects, features, and advantages made apparent to those skilled in the art by referencing the accompanying drawings.

FIG. 4 illustrates a circuit diagram of an exemplary temperature sensing circuit of the integrated circuit sensing system of FIG. 1, consistent with at least one embodiment of the invention.

FIG. 5 illustrates a circuit diagram of an exemplary temperature sensing circuit of the integrated circuit sensing system of FIG. 1.

FIGS. 6A and 6B illustrate a circuit diagram and associated signal waveforms for an exemplary resistor-switched capacitor divider that may be included in the sensing circuits of FIGS. 1-5.

The use of the same reference symbols in different drawings indicates similar or identical items.

DETAILED DESCRIPTION

A technique for sensing an environmental parameter is disclosed. The technique generates an oscillating signal using a variable resistance sensitive to a variable parameter. A frequency of the oscillating signal is directly dependent on the variable resistance. A time-to-digital converter generates a digital code indicative of the variable resistance. The digital code is generated based on the frequency of the oscillating signal and a second frequency of a reference clock signal. The second frequency is insensitive to the variable parameter. The variable resistance may be a metal resistor and the reference resistance may be generated using a capacitor that is switched at a particular frequency. The measured resistance may be used to control a voltage-controlled oscillator. The oscillating signal frequency may be converted to a digital signal and post-processed for use as an indicator of absolute temperature or other environmental parameter.

Figure 1:
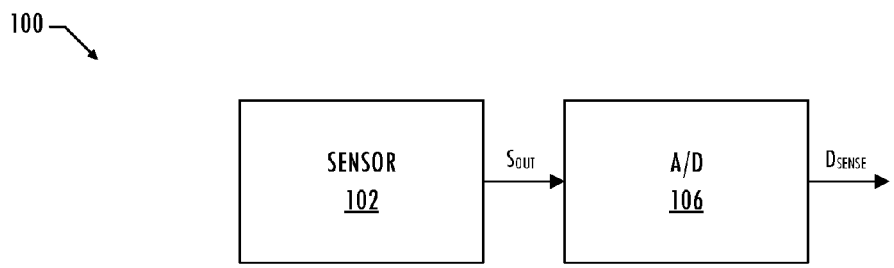
FIG. 1 illustrates a functional block diagram of an integrated circuit sensing system.

Referring to FIG. 1, exemplary sensor system 100 includes sensor 102 that generates analog signal $S_{OUT}$, which is indicative of an environmental condition (e.g., absolute temperature). Analog-to-digital converter 106 converts analog signal $S_{OUT}$ to digital value $D_{SENSE}$. That digital value may be used to adjust parameters of an integrated circuit system (e.g., to compensate for frequency dependence on temperature of a microelectromechanical systems (MEMS) resonator).

Typically, a thermoelectric transducer of sensor 102 determines the accuracy of digital value $D_{SENSE}$. To maintain a sufficient level of accuracy for a target application, the thermoelectric transducer is designed to have less sensitivity to other environmental variables such as mechanical stress, humidity, time (i.e. aging), etc. Any non-linearity of the electrical output with respect to temperature may introduce a need to post-process analog signal $S_{OUT}$ or digital value $D_{SENSE}$ for use in the target application. Therefore, selection of components for use in sensor 102 and configuration of those selected components to map changes in temperature into electrical behavior should be considered carefully.

Conventional temperature sensors use differences in base-emitter voltages of bipolar junction diodes to sense temperature due to the proportional to absolute temperature (PTAT) and ratio-metric behavior of those base-emitter voltages. However, the low transduction gain (e.g., approximately 0.3 mV/C) of bipolar junction diodes increases noise and accuracy performance requirements of the associated analog-to-digital converter. Alternatively, use of the turn-on voltage of a bipolar junction diode may improve transduction gain to approximately −1.6 mV/C. However, the absolute accuracy of that technique is more sensitive to diode biasing. Furthermore, the piezojunction effect, i.e., changes in current-voltage characteristics of a p-n junction due to changes in mechanical stress may degrade accuracy of the resulting sensor.

Figure 2:
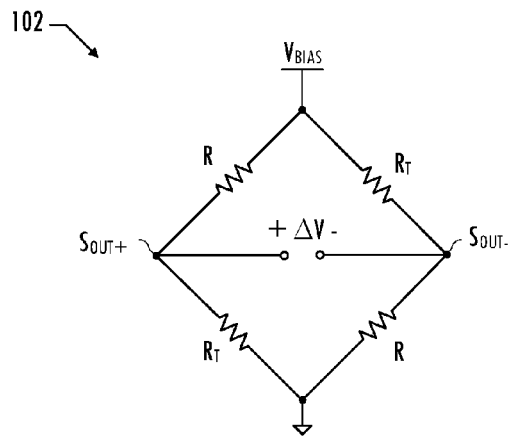
FIG. 2 illustrates a circuit diagram of an exemplary temperature sensing circuit of the integrated circuit temperature sensing system of FIG. 1.

Resistive bridge techniques may improve transduction gain to approximately 3 mV/C and maintain ratio-metric operation. Referring to FIG. 2, exemplary sensor 102 includes a resistive bridge circuit that compares resistance $R_T$ of temperature-sensitive resistors to resistance R of reference resistors to generate a differential DC output signal of analog signal $S_{OUT}^+$ and analog signal $S_{OUT}^-$. The output voltage ΔV is approximately $$V_{REF}\left(\frac{R_T - R}{R_T + R}\right),$$

where $V_{REF}$ is the head voltage of the bridge circuit. Resistance R is approximately the same as resistance $R_T$ at a nominal temperature (e.g., $T_O$=25° C.) resulting in ΔV being approximately zero Volts at the nominal temperature.

Although it may be desirable to select the reference resistor with resistance R having a temperature dependence opposite to a temperature dependence of resistance $R_T$ (e.g., −3600 parts-per million per degree Celsius (i.e., ppm/° C.)), such resistors are not readily available in a typical integrated circuit manufacturing process. Instead, a reference resistor is chosen to have resistance R with a temperature dependence that is as negative as practicable (e.g., n+ polysilicon resistors having resistance R with a temperature dependence of approximately −900 ppm/° C.). Resistance R is more weakly dependent on temperature as compared to resistance $R_T$. As a result, resistance R may be considered to be a reference resistance while the temperature dependence of resistance $R_T$ dominates the temperature dependence of differential voltage ΔV. Accordingly, differential voltage ΔV indicates the change in resistance $R_T$ due to temperature relative to reference resistance R. Note that since the first-order temperature effects tend to dominate the temperature behavior of resistors, the discussion included herein applies only to first order temperature effects and does not address higher-order temperature effects. The differential voltage ΔV will indicate any mismatch between the actual resistance R and the actual resistance $R_T$. For example, at a maximum temperature (e.g., 85° C.), the differential voltage ΔV will be positive and at a minimum temperature (e.g., −40° C.), the differential voltage ΔV will be negative. Ideally, the differential voltage ΔV is a linear function of temperature. Although $R_T$−R and $R_T$+R are linear functions of temperature, ΔV may not have a perfectly linear temperature dependence.

An actual reference resistor having resistance R may have nonidealities associated with it that reduce the accuracy of the sensed temperature. In some applications, absolute accuracy of the sensed temperature is not required, but rather correspondence of a particular sensed temperature to a particular frequency of operation of a system is sufficient and any non-idealities may be calibrated out. For example, a MEMS resonator application has a temperature coefficient of approximately 10 ppm/° C. Apparent changes in temperature impact the accuracy of the system. If an apparent temperature change is 1° C., then the frequency must be changed by 10 ppm. However, changes in the sensed temperature due to effects unrelated to temperature may still be problematic for the system. Even if there is no actual temperature change, the product specifications for the MEMS resonator must account for the effects of strain or aging on the reference resistor of the temperature sensor and the system may only be accurate to within +/−20 ppm. Accordingly, an ideal reference resistor has a resistance R that is insensitive to aging and mechanical strain.

In at least one embodiment of sensor 102, the bridge circuit uses polysilicon resistors to implement reference resistance R and uses temperature-sensitive resistors, i.e., thermistors, are used to implement PTAT resistance, $R_T$. Polysilicon resistors typically have highly linear resistances and are designed to have small temperature coefficients. However, conventional polysilicon-based resistors (silicided to form a thermistor, p+/n+ doped to form a reference resistor) may be sensitive to mechanical stress (e.g., due to their polycrystalline structure) and may age with time (e.g., due to doping migration). Thus, the output of a temperature sensor output may change as a function of environmental factors unrelated to temperature and, thereby reduce overall accuracy of the temperature sensor.

Figure 3:
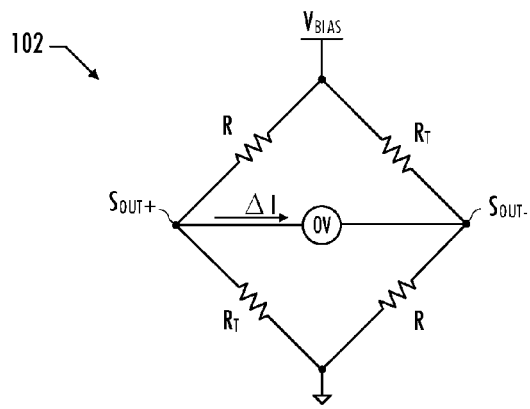
FIG. 3 illustrates a circuit diagram of an exemplary temperature sensing circuit of the integrated circuit sensing system of FIG. 1, consistent with at least one embodiment of the invention.

In other embodiments of sensor 102, the reference resistors are implemented using diffusion resistors, which are less commonly used due to their large voltage and temperature coefficients, but are less prone to aging. However, diffusion resistors have resistances with a greater temperature coefficient than the temperature coefficient of the resistance of a polysilicon resistor. Thus, use of diffusion resistors as reference resistors reduces circuit sensitivity and reduces the value of differential voltage ΔV. This tradeoff may result in higher power consumption in associated sensing circuits (e.g., an analog-to-digital converter circuit) for a particular signal-to-noise ratio. Diffusion and polysilicon resistors are also considered piezoresistive. Although circuits that use thin film polysilicon resistors or diffusion resistors are relatively low cost, the response of those resistors to mechanical strain and/or aging degrades the accuracy of the temperature measurement. Use of strain sensors to sense and compensate for the effects of mechanical strain on diffusion or polysilicon reference resistors may consume a non-trivial amount of power and area while also increasing system complexity. To reduce the piezoresistivity and effects of aging on the resistive bridge, metal resistors may be used as the thermistors and switched capacitor resistors may be used as the reference resistors for comparison. FIG. 3 illustrates an embodiment of sensor 102 configured to provide output current ΔI using terminals $S_{OUT+}$ and $S_{OUT-}$ coupled to a virtual ground (illustrated as 0V).

Referring to FIG. 4, rather than use typical integrated circuit reference resistors, temperature sensor resistive bridge 302 includes reference resistors 308 and 310, which provide relatively strain-invariant resistances. Reference resistors 308 and 310 may include current sources derived from temperature insensitive, strain-invariant circuits that provide currents that are proportional to the bias voltage, e.g., I=α$V_{REF}$, to maintain ratio-metric operation. In addition, note that using reference current sources to realize the reference resistances increases the sensitivity of the bridge circuit by a factor of two at the point where the bridge is balanced (i.e., $T_O$, e.g., 25° C.) because the current sources are high impedances and do not load the bridge circuit and eliminate the resistor divider of the bridge circuits of FIGS. 2 and 3. Referring back to FIGS. 4 and 5, reference resistors 308 and 310 may be implemented using current sources having a p-type metal-oxide-semiconductor (i.e., PMOS) current source for reference resistor 308 coupled to $V_{REF}$ and an n-type metal-oxide-semiconductor (i.e., NMOS) current source for reference resistor 310 coupled to a ground node. In other embodiments, bootstrapped, switched-capacitor based current sources, or other suitable current sources may be included in reference resistors 308 and 310.

Reference resistors 308 and 310 may include a reference resistor, $R_{T_o}$, used in voltage-to-current conversion. If the current sources used for reference resistances 308 and 310 of FIG. 4 are a weak function of temperature, output signal ΔV will have a more linear response with respect to temperature than ΔV of FIG. 2. Since resistivity is proportional to absolute temperature in metal resistors, to obtain a linear function for ΔV, a resistance that has little or no dependence on temperature in numerator or denominator improves the linearity of operation. Thus, reference resistances 308 and 310 are designed to be centered at the temperature where the bridge is balanced (i.e., ΔV=0 at temperature $T_0$ by choosing the reference resistor R=α×$V_{BIAS}$=$R_T(T_o)$, where $T_0$ is, e.g., 25° C.). This may be achieved by choosing constant α to be 1/$R_{T_o}$. Referring to FIG. 4, a realization of the reference resistances are coupled to thermistors 304 and 306, in a Wheatstone bridge configuration and coupled to a voltage reference node and a ground node, respectively. Thus, the output voltage is approximately ΔV=$V_B$(2×$R_T$−1), where $$\alpha = \frac{1}{R_{T_o}}.$$

Accordingly, $$\Delta V \approx V_{BIAS}\left(\frac{R_T - R_{T_o}}{R_{T_o}}\right).$$

FIG. 5 illustrates an embodiment of temperature sensor resistive bridge 302 configured to provide output current ΔI using terminals $S_{OUT+}$ and $S_{OUT-}$ coupled to a virtual ground (illustrated as 0V).

In at least one embodiment, sensor 102 (which may be a voltage divider or bridge circuit of FIG. 4 or FIG. 5) includes one or more reference resistors implemented using a switched-capacitor resistance. Referring to FIGS. 6A and 6B, exemplary reference resistance 310 includes a switched capacitor driven by a two-phase clock, having phases $\phi_0$ and $\phi_1$, or other non-overlapping clocks having a low sensitivity to environmental parameters. For example, the two-phase clock may be generated using a MEMS-based oscillator, an LC-based oscillator, a crystal-based oscillator, or other suitable oscillator configured to generate a clock signal having a frequency with a low sensitivity to strain and aging. When $\phi_1$ closes the switch, node 604 charges to the voltage on node 602, $v_o$. When the first phase ends, $\phi_1$ opens the switch and the second switch closes in response to $\phi_0$, the capacitor discharges. The reference resistance conveys current from node 604 to a reference voltage node (e.g., ground node). The effective reference resistance is approximately the period of the clock, $T_{OSC}$, divided by the capacitance C, (e.g., R=$T_{OSC}$/C) resulting in an average current through the reference resistance $I_{AVG}$=($v_o$)/($T_{OSC}$/C). As long as capacitance C is not a function of strain or aging and τ is not a function of strain or aging, temperature sensors including bridge circuits 302 of FIGS. 4 and 5 including switched-capacitor circuits as reference resistors 308 and 310 are less sensitive to strain and aging than sensors 102 including typical integrated circuit reference resistors of FIGS. 2 and 3. Referring back to FIGS. 4 and 5, the capacitors included in the switched-capacitor circuits used by reference resistors 308 and 310 may include a finger capacitor embedded in SiO$_2$ or a capacitor formed in a MEMS structural layer, or other suitable capacitor. The capacitor may be designed to cancel any residual strain effects by orienting two capacitors rotated 90 degrees from each other to form a composite capacitor. In other embodiments, the capacitor may be bootstrapped relative to changing voltage across it causing the capacitor to behave more like a current source load on the bridge circuit than a resistor, thus improving bridge sensitivity to temperature.

Still referring to FIGS. 4 and 5, variable resistance $R_T$ of thermistors 304 and 306 is selected to be a strong PTAT resistance (e.g., metal resistors or silicided-polysilicon resistors). An exemplary metal resistor has a variable resistance $R_T$ with a temperature dependence of approximately 3600 ppm/° C. Strain or aging may affect some thermistors. However, although metal resistors exhibit little or no effects of aging and may be affected by strain on geometry, the material is not piezoresistive and therefore the effects of strain on the resistance are negligible. Since typical metal resistors are fixed by surrounding SiO$_2$, the conductivity is substantially unchanged in response to strain on geometry.

Metal resistors are not commonly used in conventional analog circuits since metal layers in typical CMOS processes are intended to provide low-resistance interconnects and thus have very low sheet resistance. The low sheet resistance (e.g., 60 milli-Ohms per square) requires resistors having a large area to implement even small resistances (e.g., 10-20 kilo-Ohms). However, a stack of multiple metal layers coupled by conductive via(s) of a CMOS process may be configured as electrically coupled metal resistors that have reduced area as compared to a typical CMOS metal resistor, (e.g., a planar resistor formed using a narrow, serpentine metal trace implemented using a single CMOS metal layer).

In at least one embodiment of a sensor circuit, a thermistor includes a silicided-polysilicon resistor, which is a polysilicon resistor without the silicide blocked. Silicide is metal that is injected into the top of polysilicon or diffusion to decrease the sheet resistance. Therefore, a thermistor including a silicided-polysilicon resistor has a combination of polysilicon and metal resistor properties, which behaves like a PTAT resistor. Silicided-polysilicon resistors are less sensitive to strain and aging than conventional CMOS resistors. Typical silicided-polysilicon resistors have higher sheet resistances than metal resistors (e.g., 10 times the typical sheet resistance of metal) and result in metal resistors with higher resistances for the same area (e.g., 100-200 kilo-Ohms). Although the thermistors of the bridge circuit of FIGS. 4 and 5 are illustrated as a single resistor, in other embodiments of a sensor circuit, each thermistor includes a network of individual thermistor elements and/or includes one or more silicided-polysilicon resistors.

Referring to FIGS. 6A and 6B, reference resistor 310, which includes a switched-capacitor circuit, may generate a ripple in output signal $v_o$ as a result of loading a resistor (e.g., continuous conduction) and resetting a switched capacitor. The ripple may present challenges to techniques for enhancing the linearity of the resistive bridge, e.g. by connecting the resistive bridge to a virtual ground of the analog-to-digital converter front-end operational amplifier. In a Wheatstone bridge configuration where the frequency is allowed to vary and an amplifier controls a voltage-controlled oscillator generated feedback clock signal, the RC product is equal to the oscillation period:

$$v_{o,avg} = V_{BIAS} - I_{avg} \times R$$

$$I_{avg} = v_{o,avg} \times C / T_{osc}, \text{ and}$$

$$\frac{v_{o,avg}}{V_{BIAS}} = \frac{1}{1 + \frac{RC}{T_{osc}}} = \frac{1}{2},$$

$$R \times C = T_{osc}.$$

If capacitance C is constant, the period of oscillation is directly proportional to resistance R (e.g., the variable resistance $R_T$). Where temperature-induced change (i.e., change in resistance is only negligibly affected by mechanical strain or other physical parameters) dominates the change in resistance, the period of oscillation is directly proportional to temperature.

Figure 7:
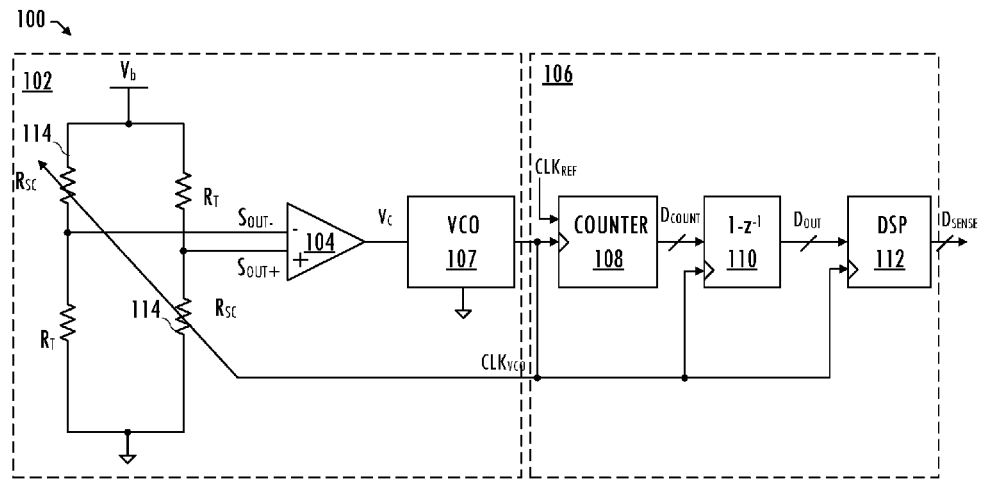
FIG. 7 illustrates a circuit diagram of an exemplary sensing circuit including a resistance-to-frequency conversion circuit consistent with at least one embodiment of the invention.

The variable resistance, which is represented by the clock period or clock frequency, may be used as a proxy for temperature under conditions where the variable resistance is not substantially sensitive to aging and mechanical strain, as discussed above. Use of a voltage controlled oscillator analog-to-digital converter provides a relatively simple interface between a voltage divider or bridge circuit and the analog-to-digital converter. Referring to FIG. 7, by forcing a virtual ground at the output of a bridge circuit, operational amplifier 104 generates control signal $v_c$ that drives voltage-controlled oscillator 107 to generate output clock signal $CLK_{VCO}$ that oscillates with a period that is proportional to the variable resistance $R_T$, thereby forcing the reference resistance $R_{SC}$ of the switched-capacitor resistor to be equal to the variable resistance $R_T$. Accordingly, system 100 maps changes in resistance, which under circumstances described above are indicative of, or proportional to, changes in temperature, to changes in frequency of oscillation of output clock signal $CLK_{VCO}$ generated by voltage-controlled oscillator 107.

The analog information in output clock signal $CLK_{VCO}$ (e.g., period or frequency of oscillation) may then control counter 108 or other time-to-digital converter circuit, which uses the period of output clock signal $CLK_{VCO}$ as an interval from which to count periods of reference clock signal $CLK_{REF}$, which is generated by a stable reference oscillator (e.g., a crystal oscillator, MEMS oscillator, LC oscillator, etc.) that is insensitive to environmental parameters as compared to the sensitivity to environmental parameters of output clock signal $CLK_{VCO}$. For example, reference clock signal $CLK_{REF}$ may be at least one order of magnitude less sensitive to the environmental parameter being sensed than output clock signal $CLK_{VCO}$. In other embodiments, reference clock signal $CLK_{REF}$ controls counter 108 to count periods of output clock signal $CLK_{VCO}$. In at least one embodiment, counter 108 is a resettable counter. In other embodiments, counter 108 is configured to wrap around or rollover and high-pass filter 110 provides first-order noise-shaping to generate digitized output $D_{OUT}$ from digital count code $D_{COUNT}$. In addition, digital signal processor 112 may be configured to suppress high frequency noise introduced by the noise-shaping or filter quantization noise, or to make digital corrections to the digitized output $D_{OUT}$. The resulting digital output $D_{SENSE}$ may have higher resolution and accuracy than digital count code $D_{COUNT}$.

Figure 8:
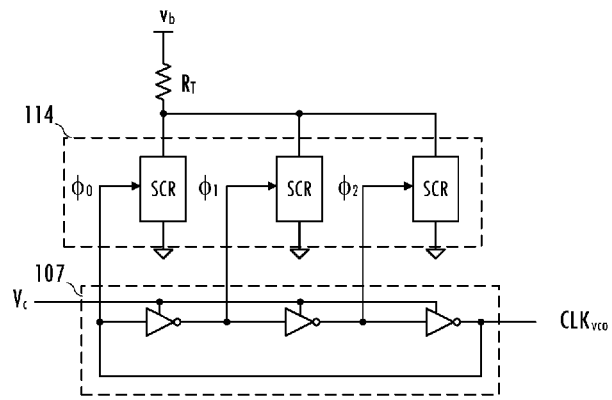
FIG. 8 illustrates a circuit diagram of an exemplary portion of the sensor system of FIG. 7 including a multi-phase switched-capacitor circuit and voltage controlled oscillator consistent with at least one embodiment of the invention.

Referring to FIG. 8, in at least one embodiment, switched-capacitor circuit 114 includes multiple switched capacitor resistors coupled in parallel to reduce bridge output ripple at the virtual ground of operational amplifier 104. Switched-capacitor circuit 114 receives multiple clock phases of output clock signal $CLK_{VCO}$ from voltage-controlled oscillator 107 to drive corresponding switched capacitor resistors of switched-capacitor circuit 114. Referring to FIG. 7, accuracy of resistance-to-frequency converter 100 may be further improved by implementing chopping techniques on the input of the operational amplifier 104. Exemplary chopping techniques modulate any input voltage offset or other low frequency noise to a higher frequency for filter attenuation at a higher frequency.

Figure 9:
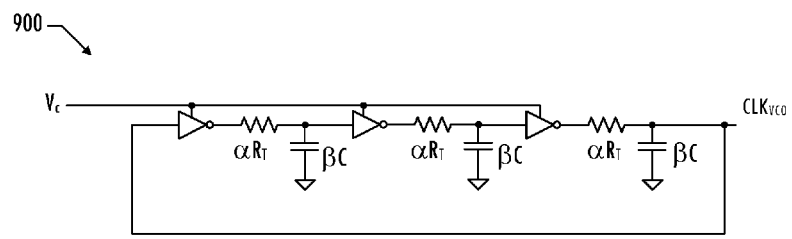
FIG. 9 illustrates a circuit diagram of an exemplary ring oscillator that may be included in the resistance-to-frequency conversion circuit consistent with at least one embodiment of the invention.
Figure 10:
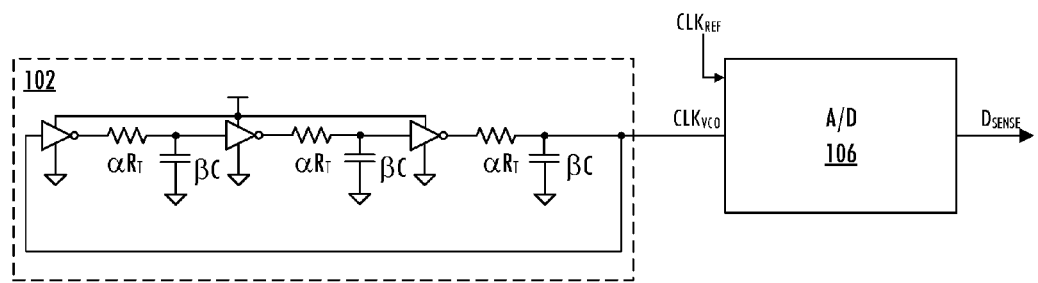
FIG. 10 illustrates a circuit diagram of an exemplary sensing circuit including a resistance-to-frequency conversion circuit consistent with at least one embodiment of the invention.

Voltage-controlled oscillator 107 may be formed using metal resistance and metal-based capacitance, which causes the native frequency of voltage-controlled oscillator 107 to change consistent with the loop response to temperature changes and requiring only minor adjustments in response to temperature change, thereby reducing dynamic range requirements for operational amplifier 104 and improving noise performance of the sensor system. Referring to FIG. 9, in at least one embodiment, voltage-controlled oscillator 107 includes a ring oscillator, which may have a single-ended or differential topology and may be formed using a plurality of stages. Each stage includes an inverter driving an RC filter formed from metal/silicided resistance and metal capacitance. Different resistances and capacitances that are multiples of $R_T$ and C (as indicated by constants α and β) may be used to obtain a target time constant of the oscillator circuit. The variable resistance $R_T$ dominates the resistance at an output of each stage (e.g., variable resistance $R_T$ is much greater than the resistance of the inverter). Ring oscillator 900 may be incorporated into voltage-controlled oscillator 107 of FIG. 7 in high performance applications. In at least one embodiment, ring oscillator 900 is designed to have a frequency of oscillation at or near a target frequency that naturally balances the bridge circuit driving the ring oscillator (i.e., causes $R_{SC}=R_T$). The ring oscillator may be coupled to an analog varactor that provides relatively small voltage values to tune the frequency of oscillation, thereby reducing or eliminating any need for feedback control in simple temperature-to-frequency converter applications that are more cost sensitive and have relaxed accuracy requirements. In embodiments where the frequency of oscillation does not need substantial change, the operation amplifier needs less dynamic range, a smaller analog varactor may be used, and a lower-noise design results. In at least one embodiment of a sensor system, sensor 102 includes a ring oscillator having variable resistance $R_T$ configured as a stand-alone resistance-to-frequency converter, without a feedback loop, as illustrated in FIG. 10. Note that the ring oscillator circuits illustrated herein are exemplary only, and techniques described herein may use other types of oscillators (e.g., relaxation oscillators, Wein bridge oscillators, etc.).

Referring to FIGS. 1-10, in at least one embodiment of a sensor, instead of sensing absolute temperature, the sensor generates a digital signal indicative of mechanical strain on the integrated circuit. Accordingly, rather than $R_T$ being a resistance sensitive to absolute temperature, $R_T$ is a resistance sensitive to mechanical strain. For example, resistances $R_T$ of FIGS. 2-7, 9, and 10 are formed from strain-sensitive diffusion or polysilicon resistors, and the reference resistances are relatively insensitive to mechanical strain. Since resistors 308 and 310 are temperature insensitive and strain-invariant, the sensors of FIGS. 1-10 can generate $D_{SENSE}$ that is indicative mechanical strain on the integrated circuit.

Thus, various embodiments of a sensor that converts resistance to frequency for use in providing a digital representation of absolute temperature. The description of the invention set forth herein is illustrative, and is not intended to limit the scope of the invention as set forth in the following claims. For example, while the invention has been described in an embodiment in which a Wheatstone bridge circuit configuration of thermistor resistors and switched-capacitor resistors are used to detect changes in resistance as a proxy for temperature, one of skill in the art will appreciate that the teachings herein can be utilized in other arrangements of thermistors and reference resistors that produce a signal that is indicative of other environmental variables. Variations and modifications of the embodiments disclosed herein, may be made based on the description set forth herein, without departing from the scope and spirit of the invention as set forth in the following claims.

What is claimed is:

1. An apparatus comprising:
   an oscillator circuit configured to generate an oscillating signal; and
   a time-to-digital converter configured to generate a digital code indicative of a variable resistance, the digital code being generated based on a frequency of the oscillating signal and a second frequency of a reference clock signal, the second frequency being insensitive to a variable parameter,
   wherein the oscillator circuit comprises:
      a first resistor providing the variable resistance, the variable resistance being sensitive to the variable parameter, the frequency of the oscillating signal being directly dependent on the variable resistance;
      a first switched capacitor circuit configured to provide a reference resistance in response to the oscillating signal;
      a first node coupled between the first resistor and the first switched capacitor circuit;
      an amplifier configured to generate a control signal based on a first signal on the first node, the control signal being indicative of the variable resistance; and
      a voltage controlled oscillator circuit configured to generate the oscillating signal in response to the control signal.

2. The apparatus, as recited in claim 1, wherein the oscillator circuit further comprises:
   a second resistor having the variable resistance;
   a second switched capacitor circuit configured to provide the reference resistance in response to the oscillating signal; and
   a second node coupled between the second resistor and the second switched capacitor circuit,
   wherein the amplifier is further configured to generate the control signal based on a differential signal on the first node and the second node.

3. The apparatus, as recited in claim 1, wherein the control signal is strain-invariant and the variable parameter is absolute temperature.

4. The apparatus, as recited in claim 1, wherein the first switched capacitor circuit comprises a plurality of switched capacitors, each of the plurality of switched capacitors being responsive to a corresponding phase of a plurality of phases of the oscillating signal.

5. The apparatus, as recited in claim 1, wherein the variable resistance has a first dependence on absolute temperature and the reference resistance has a second dependence on absolute temperature, the second dependence being less than or having a polarity opposite to a second polarity of the first dependence.

6. The apparatus, as recited in claim 1, where the apparatus forces the reference resistance to be equal to the variable resistance using the oscillating signal.

7. The apparatus, as recited in claim 1, wherein the time-to-digital converter is a frequency counter and the digital code indicates the frequency of the oscillating signal relative to the second frequency.

8. An apparatus comprising:
    an oscillator circuit configured to generate an oscillating signal; and
    a time-to-digital converter configured to generate a digital code indicative of a variable resistance, the digital code being generated based on a frequency of the oscillating signal and a second frequency of a reference clock signal, the second frequency being insensitive to a variable parameter,
    wherein the oscillator circuit comprises:
        a ring oscillator circuit having a plurality of stages, each stage of the plurality of stages comprising:
            an inverter; and
            a low-pass filter coupled to an output of the inverter, the low-pass filter comprising:
                a resistor providing the variable resistance, the variable resistance being sensitive to the variable parameter, the frequency of the oscillating signal being directly dependent on the variable resistance; and
                a capacitor coupled between the resistor and a voltage reference node.

9. The apparatus, as recited in claim 8, wherein the variable resistance dominates a resistance at an output of each stage.

10. A method comprising:
    generating an oscillating signal having a frequency directly dependent on a variable resistance, the variable resistance being sensitive to a variable parameter; and
    generating a digital code indicative of the variable resistance, the digital code being generated based on the frequency of the oscillating signal and a second frequency of a reference clock signal, the second frequency being insensitive to the variable parameter,
    wherein generating the oscillating signal comprises:
        generating a reference resistance by transferring charge at a switching frequency in response to the oscillating signal;
        generating a control signal based on a first signal on a first node, the control signal being indicative of the variable resistance of a first resistor; and
        generating the oscillating signal in response to the control signal.

11. The method, as recited in claim 10, wherein the control signal is generated further based on a second signal on a second node, the first node and the second node providing a differential error signal indicative of a difference between the reference resistance and the variable resistance.

12. The method, as recited in claim 10, wherein the control signal is strain-invariant and the variable parameter is absolute temperature.

13. The method, as recited in claim 12, wherein the digital code is indicative of the frequency relative to the second frequency.

14. The method, as recited in claim 10, wherein generating the reference resistance comprises:
    driving a plurality of switched capacitors at the switching frequency using corresponding phases of a plurality of phases of the oscillating signal.

15. The method, as recited in claim 10, wherein the variable resistance has a first dependence on absolute temperature and the reference resistance has a second dependence on absolute temperature, the second dependence being less than or having a polarity opposite to a second polarity of the first dependence.

16. The method, as recited in claim 10, wherein the oscillating signal forces the reference resistance to be equal to the variable resistance.

17. The method, as recited in claim 10, wherein the oscillating signal has a period directly proportional to the variable resistance.

* * * * *